US005914871A

United States Patent [19]

Lin et al.

[11] Patent Number: 5,914,871

[45] Date of Patent: Jun. 22, 1999

[54] DEVICE FOR MULTI-STAGE ILLUMINANCE CONTROL FOR LIGHT SOURCE OF SCANNER

[75] Inventors: John Lin, Hsinchu; Ching Chang Lin, Taipei Hsien, both of Taiwan

[73] Assignee: Mustek Systems, Inc., Hsinchu, Taiwan

[21] Appl. No.: 09/115,525

[22] Filed: Jul. 13, 1998

[51] Int. Cl.[6] .......................... H02M 7/537; H05B 37/02

[52] U.S. Cl. .......................................... 363/131; 315/219

[58] Field of Search ................................ 363/95, 97, 98, 363/131, 132; 315/94, 209 CD, 209 T, 291, 293, 307, DIG. 7

[56] References Cited

U.S. PATENT DOCUMENTS

| | | | |
|---|---|---|---|
| 3,938,060 | 2/1976 | Kato et al. | 315/307 |
| 4,334,301 | 6/1982 | Kanamaru | 369/116 |
| 4,745,273 | 5/1988 | Szabo et al. | 250/207 |
| 5,189,344 | 2/1993 | Rose | 315/293 |
| 5,367,223 | 11/1994 | Eccher | 315/97 |

*Primary Examiner*—Matthew Nguyen
*Attorney, Agent, or Firm*—Skjerven, Morrill, MacPherson, Franklin & Friel; Alan H. MacPherson; Elaine H. Lo

[57] ABSTRACT

A device for controlling the illuminance of a light source in order to quickly warm up the light source to a certain brightness for a scanning operation is disclosed. The device allows multi-stages of current to be provided for the light source by adjusting a capacitance therein. For a two-stage illuminance control before scanning operations, a current having an intensity greater than required for the normal scanning operation is provided for the light source to excite the brightness of the light source to exceed the certain brightness required for the scanning operation in the first stage, and a current for generating the desired brightness for the scanning operation substitutes for the exciting current to be provided for the light source in the second stage. Thereafter, the scanning operation is performed after a short period of brightness stabilization.

9 Claims, 8 Drawing Sheets

DEVICE FOR MULTI-STAGE ILLUMINANCE CONTROL FOR LIGHT SOURCE OF SCANNER

FIELD OF THE INVENTION

The present invention is related to a device for controlling the illuminance of a light source, and more particularly to a device for multi-stage illuminance control for a cold-cathode fluorescent tube (CCFT) used in a scanner.

BACKGROUND OF THE INVENTION

A scanner has been more and more popular so as to gradually become a standard peripheral equipment of a personal computer. Therefore, scanner manufactures have been trying their best to develop a more and more powerful and/or competitive scanner. For example, a minor problem for the scanner derived from the illuminance stability of a light source of the scanner is also worthy to be seriously considered and improved.

The light source commonly used in an image scanner is a white fluorescent lamp such as a cold cathode fluorescent tube (CCFT). As known to those skilled in the art, the illuminance of a CCFT generally increases gradually when lighting up, and becomes stable after a couple of minutes. Therefore, the lamp has to be warmed up before use in order to obtain stable illuminance for stable scanning quality. Please refer to FIG. 1 which shows an illuminance variation of a CCFT having a model no. of FL-41266 (AE) and manufactured by Toa Elevam Co. (Taiwan). As shown in FIG. 1, a constant tube current ($I_L$) of 6 mA is expected to be provided for the CCFT to perform the scanning operation of the scanner. The brightness of the CCFT, however, varies with time at the outset of lighting up. During this unstable stage, as called a warm-up mode, the scanner is not allowed to enter a scan mode to normally work because of possible errors resulting from the variable illuminance. Furthermore, for some conventional scanners, the CCFT is put out after a predetermined standby period whenever a scanning run is complete. Therefore, the CCFT has to be re-started to illuminate, and another warm-up period has to be waited for if another scan run is to be performed. In brief, whenever the CCFT is switched from an off-state to an on-state, a warm-up mode is re-started, and another couple of minutes has to be waited for. Consequently, the overall scanning speed of the scanner is unsatisfactory.

SUMMARY OF THE INVENTION

An object of the present invention is to provide a device for multi-stage illuminance control for a light source of an optical scanner in order to warm up the light source quickly so as to improve the overall scanning speed of the scanner.

According to the present invention, a device for multi-stage control for a light source of an optical scanner includes a constant DC voltage supply for providing a DC voltage of a constant value; a DC-AC inverter electrically connected to said constant DC voltage supply for converting said DC voltage into an AC voltage; a current control device electrically connected to said DC-AC inverter and said light source for receiving said AC voltage, and providing a desired intensity of current for said light source by adjusting a capacitance therein, said desired intensity of current being selected from a group consisted of at least a first intensity of current for a first state, and a second intensity of current for a second state; and a state-switching device electrically connected to said current control device for outputting a switching signal to have said current control device change said desired intensity of current from said first intensity to said second intensity when said light source is to be changed from said first state to said second state.

In a preferred embodiment, the first intensity is greater than said second intensity so that the brightness of the light source increases rapidly at first, and then decreases to and stabilizes at a certain brightness. The first intensity of current is provided for said light source for a first period, and then said second intensity of current is provided for said light source. After a second period of the provision of the second intensity of current, the light source starts performing a scanning operation.

Basically, the first state is a warm-up state, and the second state is a scan state. For a light source having reduced brightness between scanning runs, the first state may be a standby state or an idle state.

Preferably, the current control device includes a plurality of capacitors, each of which is electrically connected to said DC-AC inverter and has a connecting point to be selectively conducted with said light source; and a single-pole multi-throw switch electrically connected to said state-switching device, said light source and one of said connecting points to generate a selected capacitance so as to provide said desired intensity of current for said light source. In other words, when a relative large intensity of current is to be provided for the light source, the single-pole multi-throw switch is switched to conduct the capacitor having a relatively large capacitance. On the contrary, when the single-pole multi-throw switch is switched to conduct the capacitor having a relatively small capacitance, a relative small intensity of current will be provided for the light source. In a more preferred embodiment, the single-pole multi-throw switch is a relay.

For a cold cathode fluorescent tube (CCFT) serving as the light source of an image scanner, the device according to the present invention has especially satisfactory effect.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
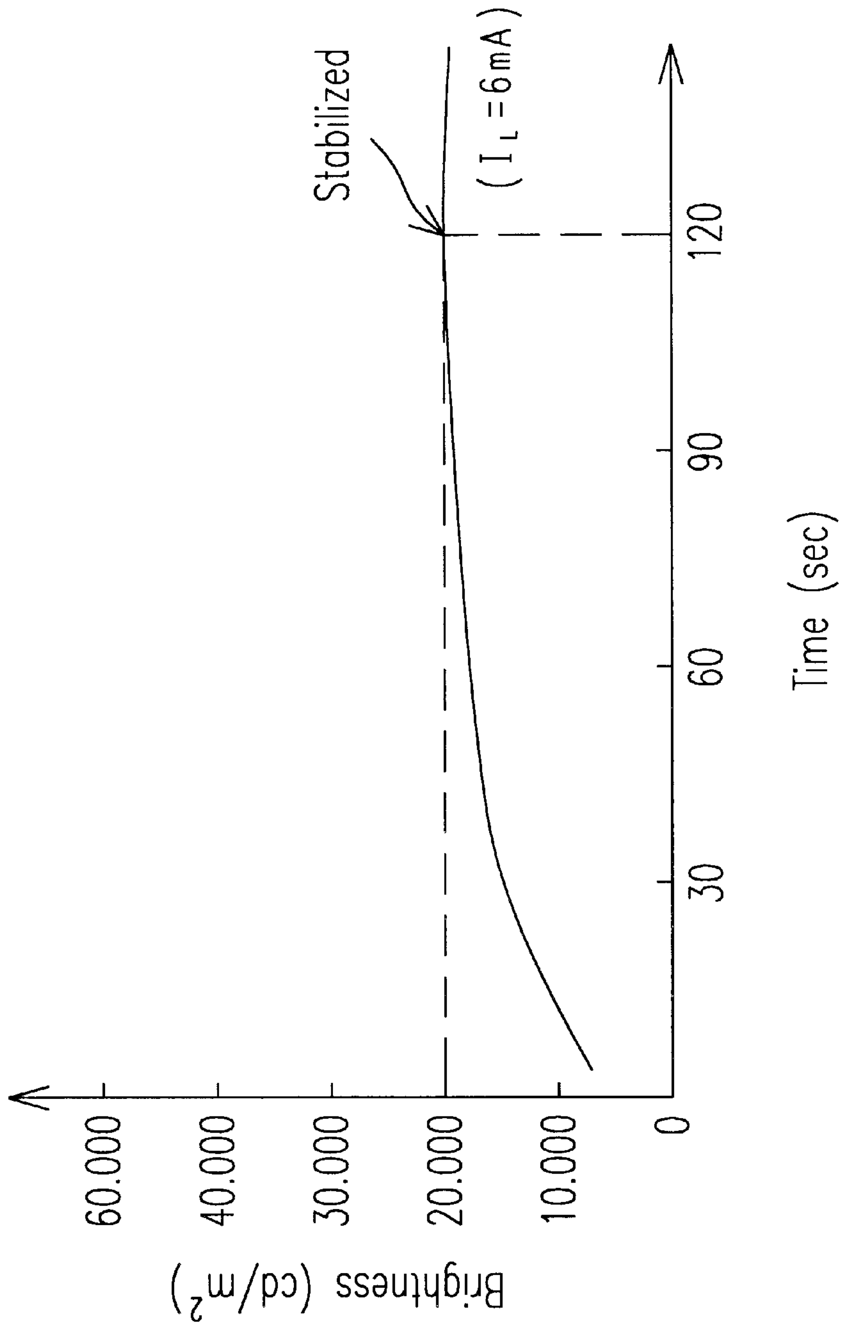
Fig. 1 (PRIOR ART)
FIG. 1 is a brightness vs. time plot schematically showing an illuminance variation of a CCFT when it is turned on and provided with a constant tube current of 6 mA.
Figure 2:
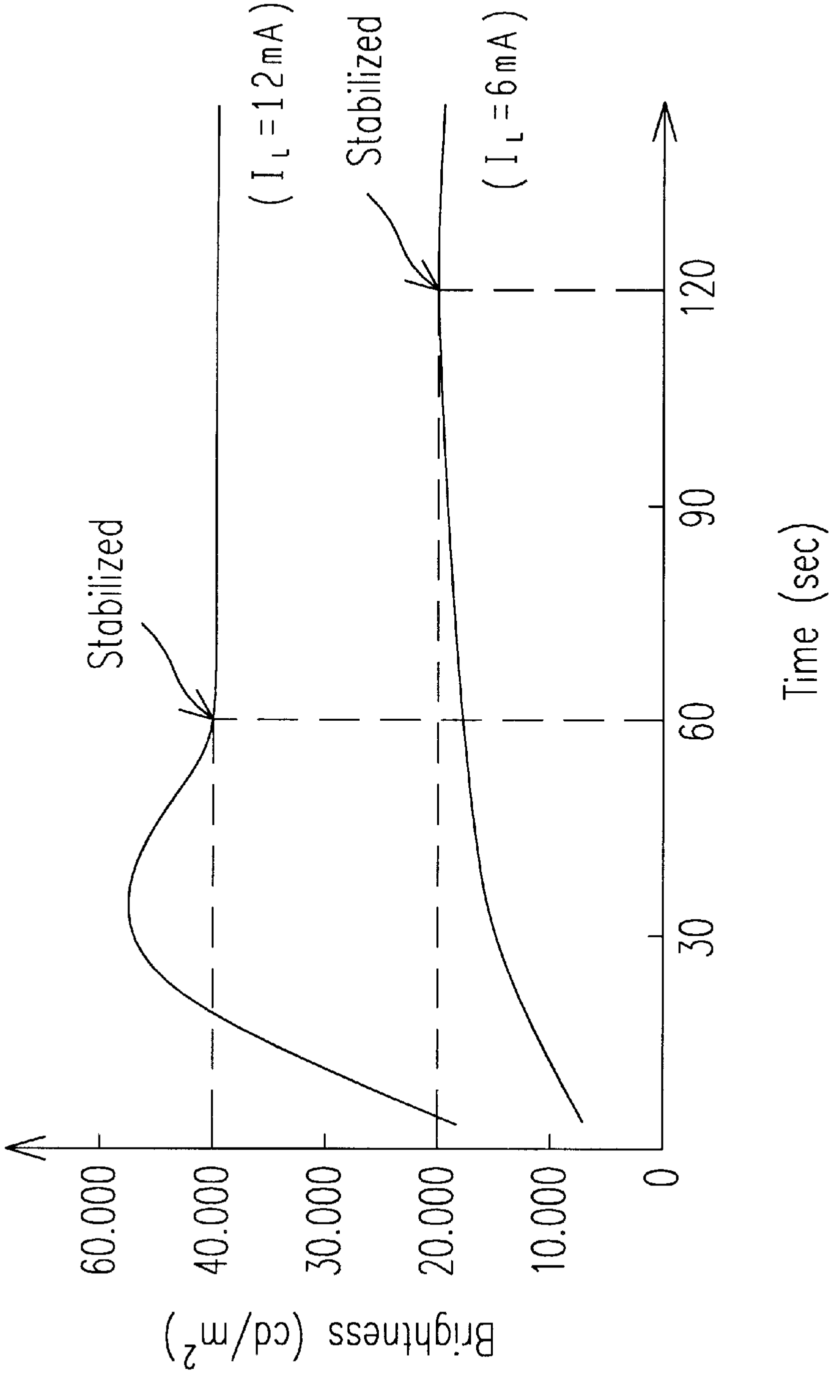
Fig. 2(PRIOR ART)
FIG. 2 is a brightness vs. time plot schematically showing two curves of illuminance variations of the CCFT of FIG. 1 when it is turned on and provided with two kinds of constant tube current of 12 mA and 6 mA, respectively.

Please refer to FIG. 2 which depicts a condition similar to that of FIG. 1 except that the tube current provided for the CCFT is 12 mA. Two curves for showing the brightness variations with time under the two intensities of current, respectively, are put together in a single plot to make comparison. As shown in FIG. 2, while a stable brightness of about 20,000 cd/$m^2$ is achieved in about 120 seconds in the case of 6 mA current, a stable brightness of about 40,000 cd/$m^2$ is achieved in about 60 seconds in the case of 12 mA current. It is apparent that the promotion of the tube current raises the brightness of the CCFT, and effectively reduces the time period required for stabilizing the brightness.

Figure 3:
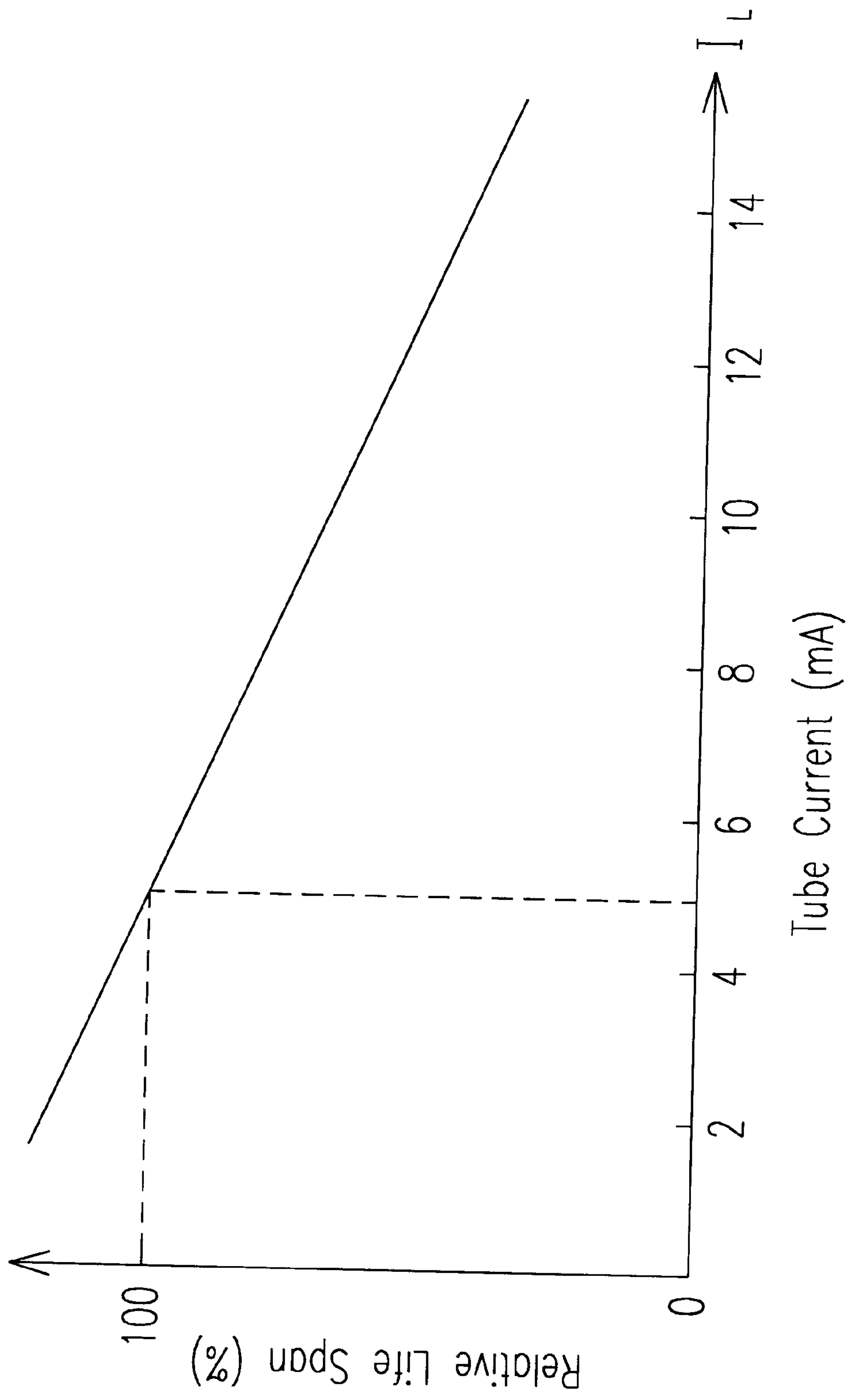
Fig. 3 (PRIOR ART)
FIG. 3 is a relative life span vs. tube current $I_L$ schematically showing the influence of the tube current intensity on the life span of the CCFT of FIG. 1.

Unfortunately, referring to FIG. 3, a tube current intensity is in inverse proportion to a life span of a CCFT so that the intense tube current results in a short life span of the CCFT. It is not desirable for a scanner manufacturer.

Therefore, a device for quickly warming up the CCFT without significantly reducing the life span of the CCFT is disclosed here.

Figure 4:
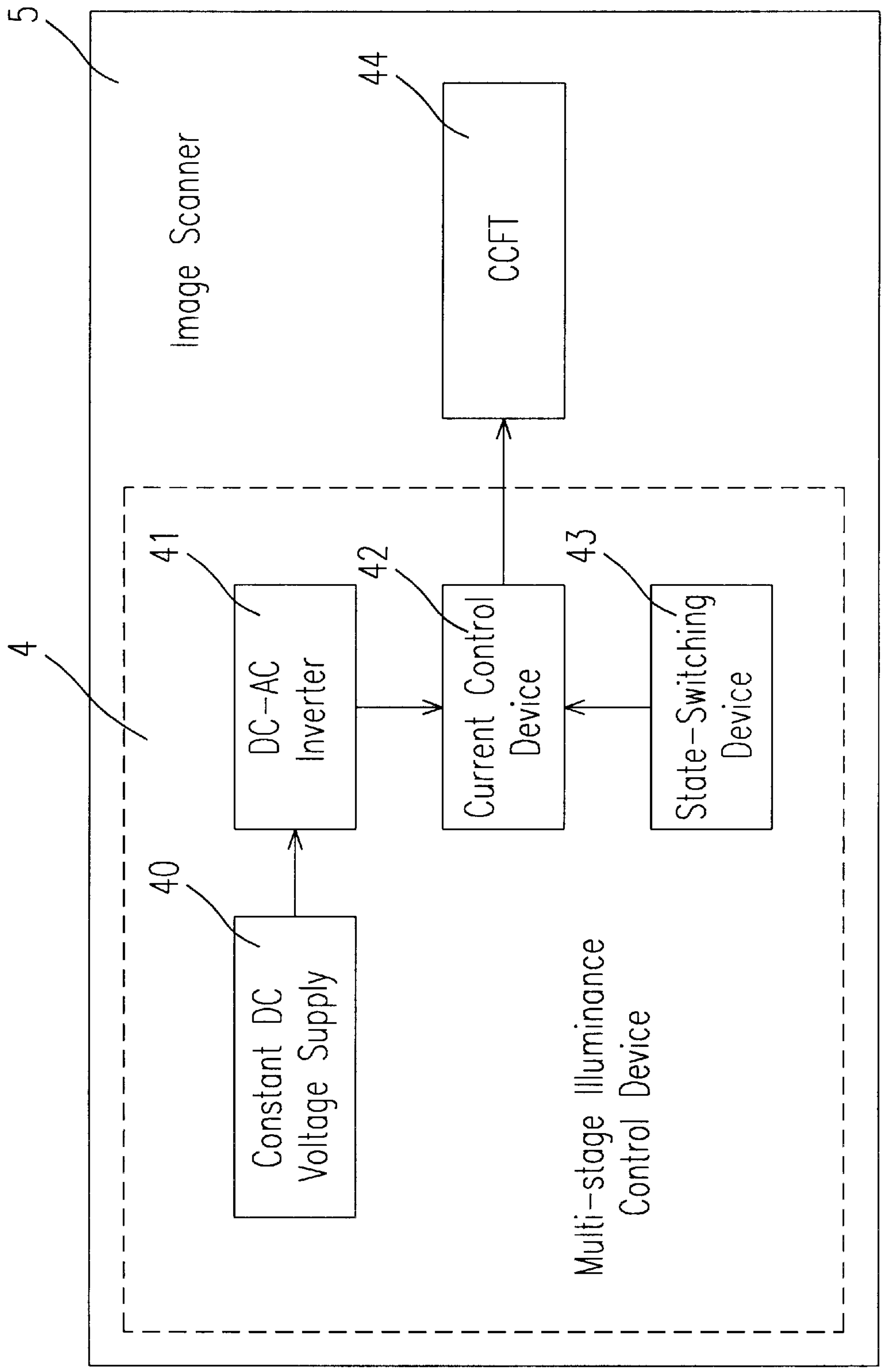
FIG. 4 is a schematic block diagram showing a preferred embodiment of a device for warming up a CCFT of an image scanner according to the present invention.

Please refer to FIG. 4 which is a schematic block diagram showing a preferred embodiment of a device 4 for warming up a CCFT 44 of an image scanner 5 according to the present invention. The device shown in FIG. 4 includes a constant DC voltage supply 40, a DC-AC inverter 41, a current control device 42, and a state-switching device 43. The constant DC voltage supply 40 outputs a constant direct-current voltage. The DC-AC inverter 41 converts the constant direct-current voltage into a constant alternate-current voltage which is outputted to the current control device 42. The intensity of the current provided for the CCFT 44 from the current control device 42 may be changed in response to a switching signal outputted by the state-switching device 43.

Figure 5:
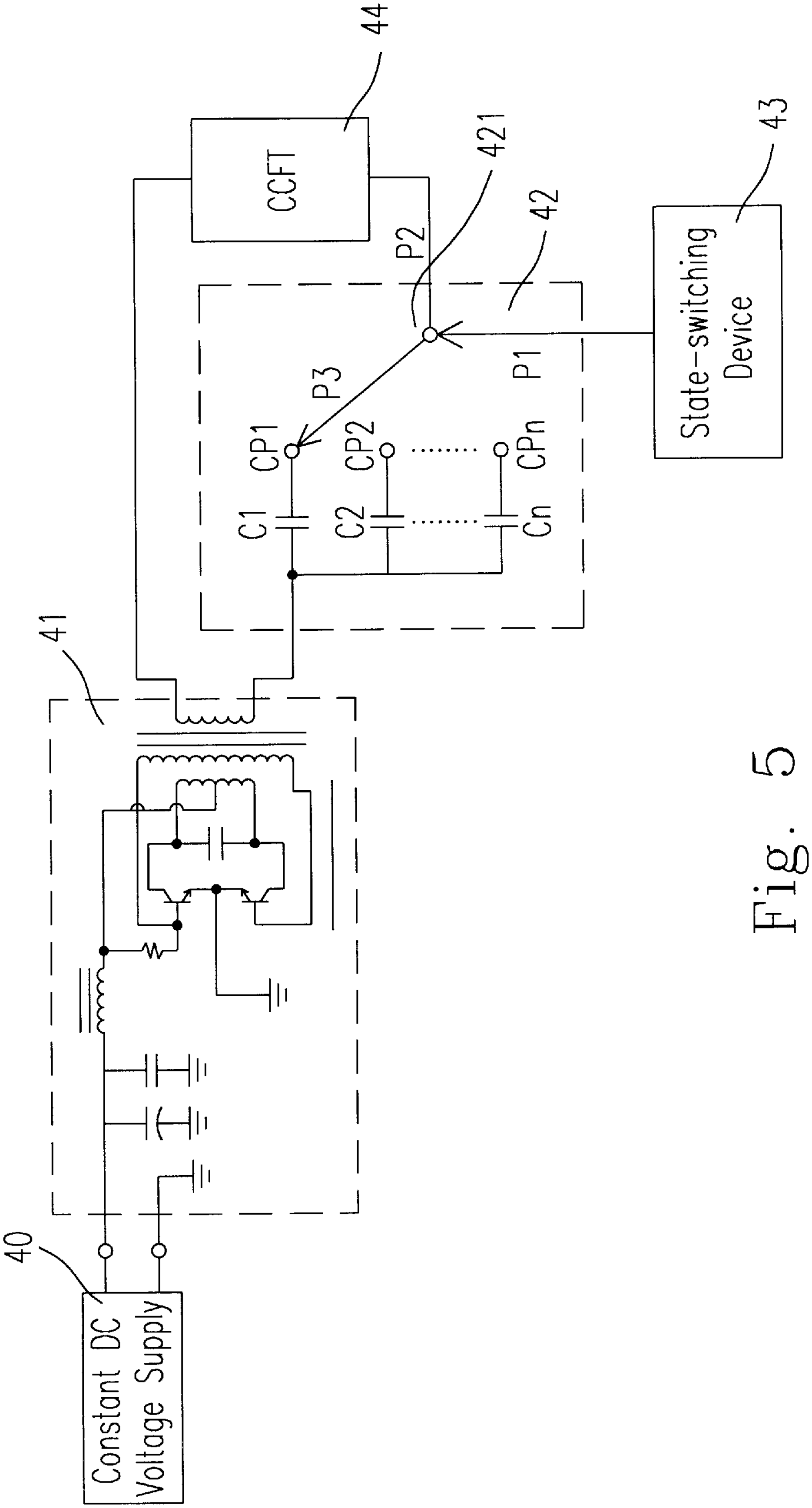
FIG. 5 is an exemplary circuit diagram of the device of FIG. 4.
Figure 6:
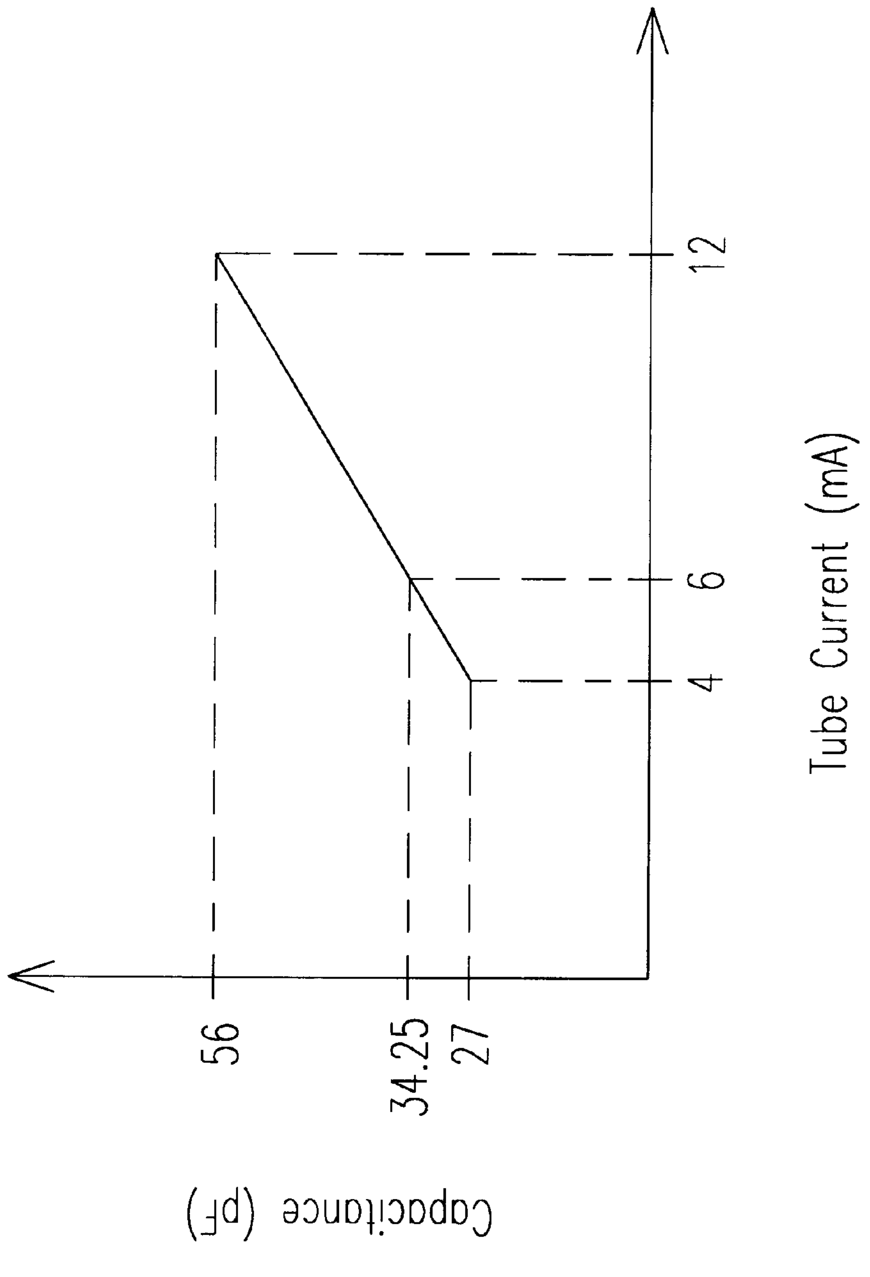
FIG. 6 is a capacitance vs. tube current plot of the device of FIG. 4 when it is used with a CCFT.

Now referring to FIG. 5, a partial circuit diagram of the device of FIG. 4 is given as an example for further illustration. In this example, the current control device 42 includes a plurality of capacitors C1~Cn having decreasing capacitances, and a high-voltage resistant relay 421 having two terminals P1 and P2 thereof connected to the state-switching device 43 and the CCFT 44. Further referring to FIG. 6, the relationship between the capacitance selected in the current control device 42 and the tube current provided for the CCFT 44 in the presence of the constant alternate-current voltage is shown. For example, when the CCFT 44 requires a 12 mA current, the relay 421 has a further terminal P3 connected to the connecting point CP1 to conduct the capacitor C1 having a capacitance of 56 pF with the CCFT 44 so that the 12 mA current can be provided for the CCFT 44. Afterwards, when a 6 mA current in lieu of the 12 mA current is to be provided for the CCFT 44, the state-switching device 43 will send a switch signal to the relay 421 to have the terminal P3 switched to be connected to the connecting point CP2 to conduct the capacitor C2 having a capacitance of 34.25 pF with the CCFT 44. By this way, a multi-stage illuminance control for a CCFT can be effectively performed.

Hereinafter, a method taking advantage of the properties of the relatively low and the relatively high current intensity cases as shown in FIGS. 1 and 2 to optimize the warm-up time and the CCFT life span is illustrated with reference to FIG. 7, which can be achieved by the device according to the present invention. In other words, the stable brightness for performing the scanning operation is desired to be kept as low as 20,000 cd/$m^2$ to avoid the reduction of the life span of the CCFT, and the warm-up time is desired to be shorter than 120 seconds.

Figure 7:
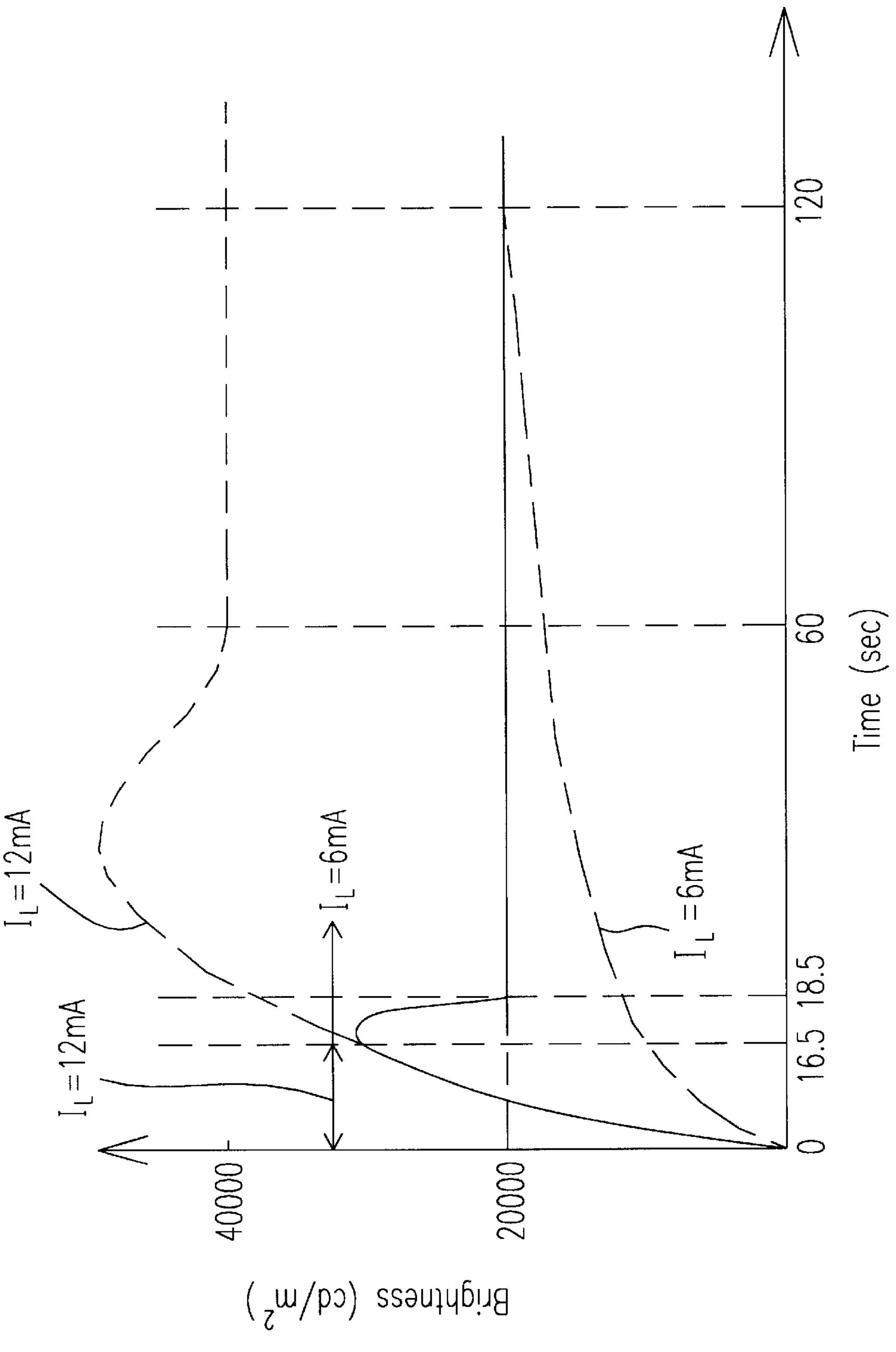
FIG. 7 is a brightness vs. time plot of a CCFT used with the device of FIG. 5, in which the comparison among this method and the conventional methods indicated by FIGS. 1 and 2 is shown.

FIG. 7 schematically shows a method for warming up a CCFT of an optical scanner effectively and safely. The curve of a solid line indicates the brightness variation with time resulting from a two-stage operation for the tube current provided for the CCFT. The other two curves of dotted lines show the two curves the same as those of FIG. 2 each of which is realized by a one-stage operation. The comparison among these situations is also shown here. In FIG. 7, a tube current of 12 mA is provided for the CCFT at the time that the CCFT is turned on. The 12 mA current is provided for about 16.5 seconds to excite the brightness of the CCFT to rapidly increase to a level over 20,000 cd/$m^2$, e.g. 30,000 cd/$m^2$, and then a 6 mA current substitutes for the relatively intense current to be provided for the CCFT. The brightness of 30,000 cd/$m^2$ then decreases gradually. After a stabilizing period of about 2 seconds with the 6 mA current, the brightness of the CCFT has stabilized at 20,000 cd/$m^2$ which is suitable for performing a scanning operation. By this way, the overall warm-up time is equal to 18.5 seconds which is significantly reduced compared to the warm-up time of the two one-stage operations, i.e. 120 seconds and 60 seconds, respectively.

In addition to the application to a situation that the CCFT is originally in an off state in which the scanner is just powered on, such a warm-up method can be used for a situation that the CCFT is originally in an idle state in which the CCFT is put out temporarily in the interval between two scanning runs, and/or a situation that the CCFT is originally in a standby state in which the CCFT is at a lower level of brightness in the interval between two scanning runs. Of course, the idle state is also a kind of standby state, or can be one of the stages of a multi-stage standby mode.

Figure 8:
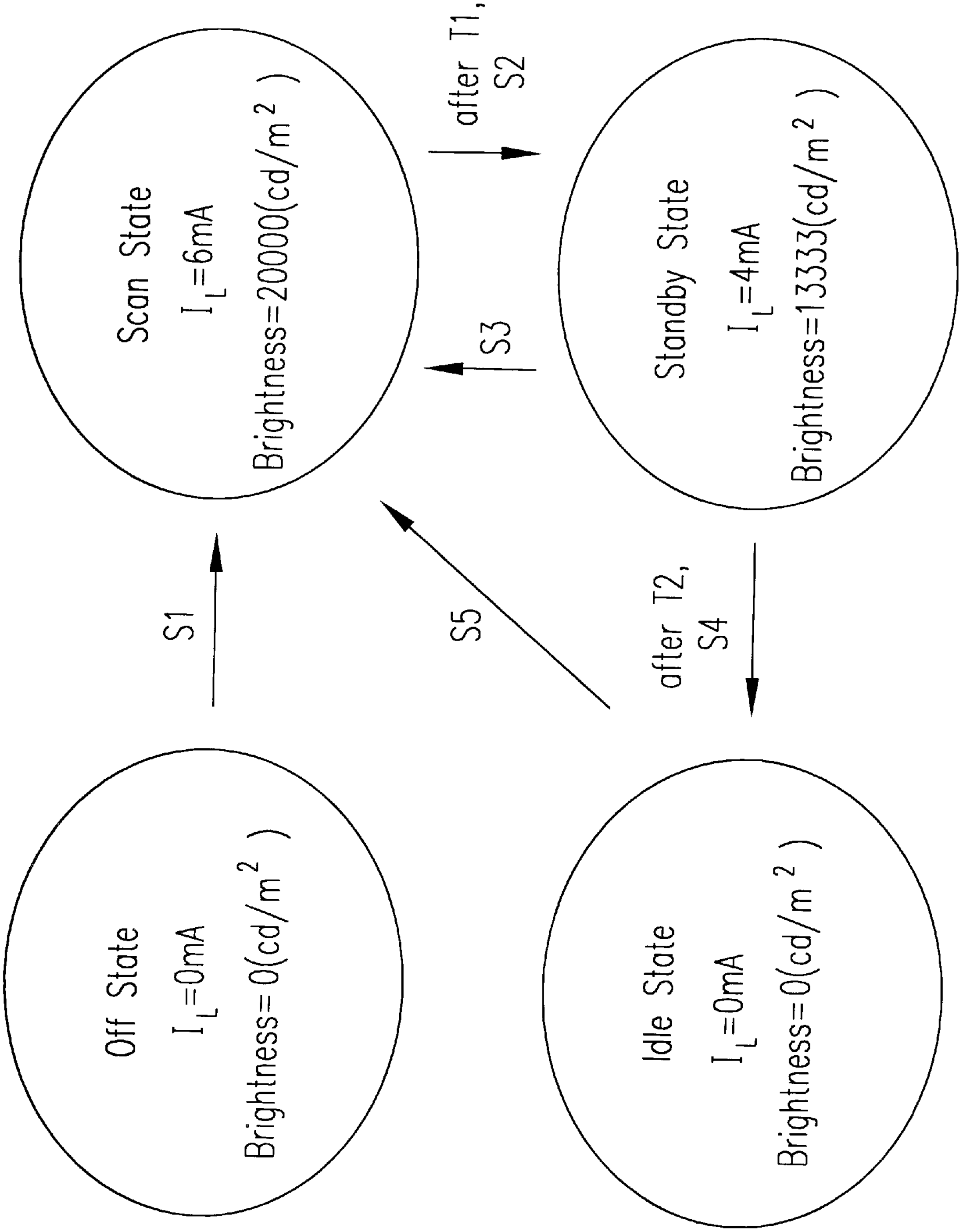
FIG. 8 schematically shows how the present device is associated with the conversion relationship among an off, an idle, a standby and a scan states.

Refer to FIG. 8 which shows an exemplary linkage among these states. In this example, a CCFT having a model no. of FL-41266 (AE) and manufactured by Toa Elevam Co. (Taiwan) is used to provide illuminance for performing the scanning operation. Four CCFT states as mentioned above are provided for power control. After the scanner is turned on, the CCFT which is in an off state is warmed up by the present device according to the aforementioned method of FIG. 7. During a scanning run is performed, the CCFT is kept at a scan state (see arrow S1). After the scanning run is completed but next scanning run is not ready to be performed for a predetermined period T1, the CCFT enters a standby state which is of a brightness of CCFT lower than that in the scan state (see arrow S2). When the next scanning state is performed within the time period T1, the CCFT is warmed up again by the present device according to aforementioned method of FIG. 7 (see arrow S3). On the contrary, if the next scanning run is still not performed after a further predetermined period T2, the CCFT will enter an idle state (see arrow S4). Similarly, the present device can also be used to wake up the CCFT at the idle state (see arrow S5) according to the method of FIG. 7.

By the multi-stage illuminance control device according to the present invention, the warm-up time can be effectively reduced without significantly affecting the life span of the CCFT.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for multi-stage control for a light source of an optical scanner, comprising:

a constant DC voltage supply for providing a direct-current voltage of a constant value;

a DC-AC inverter electrically connected to said constant direct-current voltage supply for converting said direct-current voltage into an alternate-current voltage;

a current control device electrically connected to said DC-AC inverter and said light source for receiving said alternate-current voltage, and providing a desired intensity of current for said light source by adjusting a capacitance therein, said desired intensity of current being selected from a group consisted of at least a first intensity of current for a first state, and a second intensity of current for a second state; and a state-switching device electrically connected to said current control device for outputting a switching signal to have said current control device change said desired intensity of current from said first intensity to said second intensity when said light source is to be changed from said first state to said second state.

2. The device according to claim 1 wherein said first intensity is greater than said second intensity.

3. The device according to claim 2 wherein said first intensity of current is provided for said light source for a predetermined period, and then said second intensity of current is provided for said light source.

4. The device according to claim 1 wherein said first state is one selected from a group consisted of a warm-up state, a standby state and an idle state.

5. The device according to claim 4 wherein said second state is a scan state.

6. The device according to claim 1 wherein said current control device includes:

a plurality of capacitors, each of which is electrically connected to said DC-AC inverter and has a connecting point to be selectively conducted with said light source; and a single-pole multi-throw switch electrically connected to said state-switching device, said light source, and one of said connecting points to generate a selected capacitance so as to provide said desired intensity of current for said light source.

7. The device according to claim 6 wherein said single-pole multi-throw switch is a relay.

8. The device according to claim 1 wherein said light source is a cold cathode fluorescent tube (CCFT).

9. The device according to claim 1 wherein said optical scanner is an image scanner.

* * * * *